United States Patent [19]

Meisinger

[11] Patent Number: 5,788,290
[45] Date of Patent: Aug. 4, 1998

[54] QUICK CONNECT COUPLER

[75] Inventor: Stanlee W. Meisinger, Golden Valley, Minn.

[73] Assignee: FasTest, Inc., St. Paul, Minn.

[21] Appl. No.: 579,668

[22] Filed: Dec. 27, 1995

[51] Int. Cl.$^6$ .................................................. F16L 35/00
[52] U.S. Cl. .......................... 285/316; 285/32; 285/322; 285/312; 137/614.06
[58] Field of Search .................... 285/34, 35, 312, 285/315, 316, 322, 323; 137/614.01

[56] References Cited

U.S. PATENT DOCUMENTS

| | | |
|---|---|---|
| 1,554,187 | 9/1925 | Adams ........................... 285/35 |
| 1,854,674 | 4/1932 | Savon ............................ 285/35 |
| 1,995,377 | 3/1935 | Creveling . |
| 2,070,013 | 9/1937 | Krannak . |
| 2,631,872 | 3/1953 | Wurmser . |
| 2,727,759 | 12/1955 | Elliott . |
| 2,887,124 | 5/1959 | Mehl . |
| 3,039,794 | 6/1962 | De Cenzo . |
| 3,234,965 | 2/1966 | Anderson . |
| 3,435,848 | 4/1969 | Johnston . |
| 3,454,047 | 7/1969 | Johnston . |
| 3,503,637 | 3/1970 | Maeshiba . |
| 3,684,321 | 8/1972 | Hundhausen et al. . |
| 3,757,836 | 9/1973 | Masuda . |
| 3,778,092 | 12/1973 | Magorien . |
| 3,978,892 | 9/1976 | Scondino . |
| 3,997,196 | 12/1976 | Karcher et al. . |
| 4,394,874 | 7/1983 | Walter . |
| 4,395,051 | 7/1983 | Tonomura . |
| 4,530,485 | 7/1985 | Yonker et al. . |
| 4,543,995 | 10/1985 | Weh et al. . |
| 4,688,830 | 8/1987 | Meisinger et al. . |
| 4,716,938 | 1/1988 | Weh et al. . |
| 5,093,947 | 3/1992 | Weh et al. ............... 137/614.02 |
| 5,209,528 | 5/1993 | Weh et al. . |
| 5,575,510 | 11/1996 | Weh et al. .................. 285/316 |
| 5,582,223 | 12/1996 | Weh et al. .................. 285/178 |

FOREIGN PATENT DOCUMENTS

89/07729  8/1989  WIPO ........................... 285/35

Primary Examiner—Eric K. Nicholson
Attorney, Agent, or Firm—Merchant, Gould, Smith, Edell, Welter & Schmidt, P.A.

[57] ABSTRACT

A connector for providing a fluid tight connection to a fluid port having internal threads. The connector includes an exterior sleeve having a split collet retractably mounted therein. The split collet defines an axial bore and includes a distal end portion extending axially outward from an end of the sleeve and adapted for lockingly engaging the threads of the fluid port. A sealing structure is mounted on the distal portion of the collet for providing a fluid tight seal with an end portion of the fluid port. The connector further includes an expansion pin mounted within the axial bore of the split collet adjacent to the distal end portion of the split collet. The expansion pin cooperates with the split collet to move the split collet radially inward and outward. A cross member connects the expansion pin to the exterior sleeve for preventing relative axial movement between the exterior sleeve and the expansion pin. The cross member is preferably aligned generally transversely with respect to the longitudinal axis of the sleeve.

17 Claims, 9 Drawing Sheets

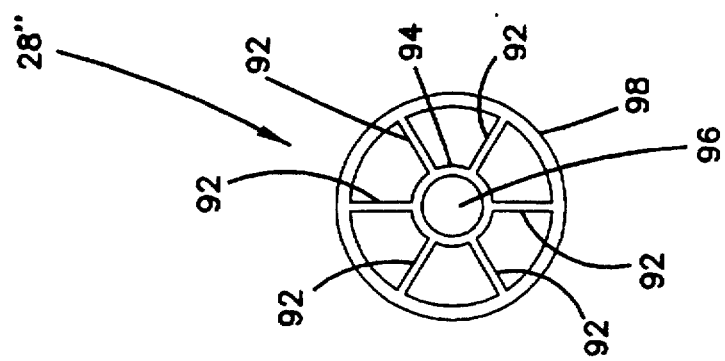
FIG. 6
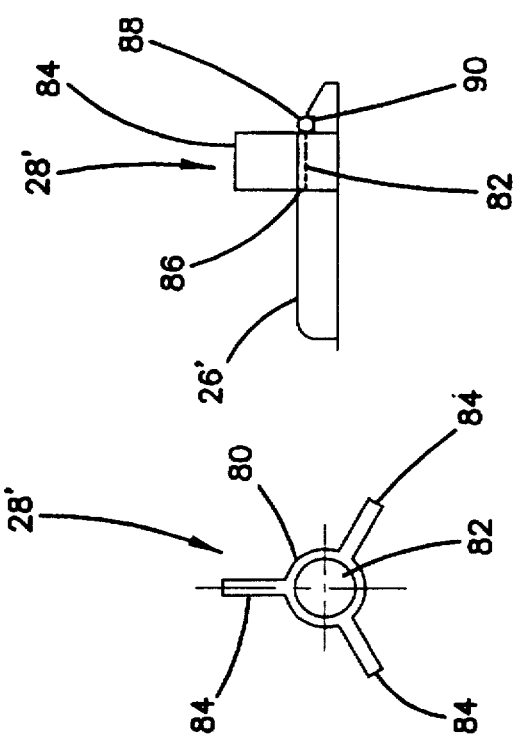
FIG. 5
FIG. 4
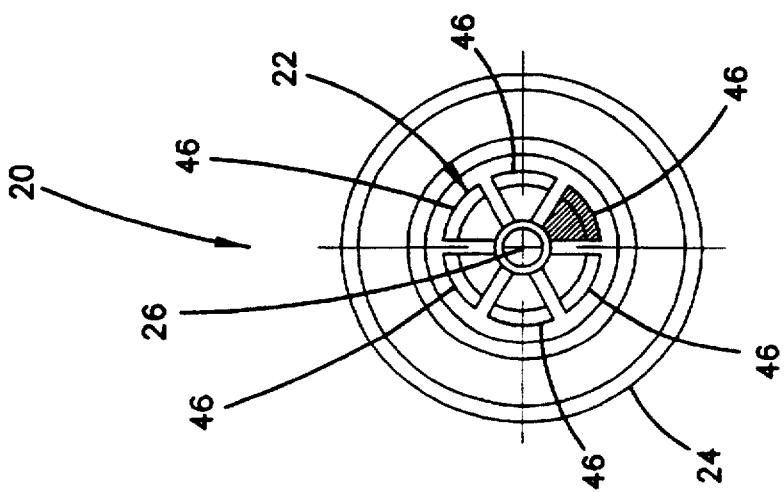
FIG. 3

QUICK CONNECT COUPLER

FIELD OF THE INVENTION

The present invention relates generally to couplings for use with pressurized fluid systems. More particularly, the present invention relates to couplings having split collet designs for providing quick connections with internally threaded fluid ports.

BACKGROUND OF THE INVENTION

Quality control systems provide a significant demand for quick connect couplings. In this regard, quick connect couplings are often used to facilitate testing manufactured products for leaks. In use, the connectors provide a quick connection to test pieces such as products that hold a fluid or products designed to work under pressure or vacuum. Once the connection is made, a test fluid is communicated through the connector to the test piece to determine if the test piece has any leaks. In order to maximize production efficiency, it is important that the connectors provide fast and reliable seals.

U.S. Pat. No. 4,716,938 to Weh et al. discloses a pressure tight plug coupling having a split collet design. The coupling includes a cylindrical housing and a piston shiftably mounted within the housing. The piston includes exterior clamping jaws that cooperate with an expansion member to move the clamping jaws radially inward or outward. The expansion member extends longitudinally through the entire length of the cylindrical housing and is connected to a rear side of the housing. The arrangement of the expansion member creates a flow path within the coupling that must be sealed by an internal sealing member. The internal sealing member is difficult to replace thereby increasing the cost of repairing the connector.

SUMMARY OF THE INVENTION

The present invention relates to a connector for providing a fluid tight connection to a fluid port having internal threads. The connector includes an exterior sleeve having a first end opposite from a second end. The exterior sleeve defines a longitudinal channel extending generally between the first and second ends. A split collet is mounted within the longitudinal channel of the exterior sleeve. The split collet defines an axial bore and includes a distal end portion extending axially outward from the first end of the sleeve. The split collet and the external sleeve are telescopically slidable with respect to each other such that the split collet is moveable between a retracted position and an extended position. The connector also includes a sealing structure surrounding the distal end portion of the split collet. The sealing structure is adapted to provide a fluid tight seal with an end portion of the fluid port. The connector further includes an expansion pin mounted within the axial bore of the split collet adjacent to the distal end portion of the split collet. The expansion pin cooperates with the split collet to move the split collet radially inward and outward. A cross member connects the expansion pin to the exterior sleeve for preventing relative axial movement between the exterior sleeve and the expansion pin. The cross member is preferably aligned generally transversely with respect to the longitudinal axis of the sleeve.

In operation, the connector is used to provide a quick connection to a threaded fluid port. A connection is provided by moving the split collet to the extended position such that the distal portion of the split collet contracts radially inward. In the contracted position, the distal portion of the split collet can be inserted into the fluid port without interference from the internal threads of the fluid port. Once the distal portion of the split collet is inserted in the fluid port, the split collet is moved to the retracted position. As the split collet retracts, the distal portion of the split collet expands radially outward so as to lockingly engage the internal threads of the fluid port. When in the retracted position, the sealing structure provides a fluid tight seal between the exterior sleeve and an end portion of the fluid port.

It will be appreciated that the present invention includes a cross member design for connecting an expansion member to an exterior sleeve. Such a design is significant because it minimizes the number of sealing paths within the connector. Minimizing the number of sealing paths reduces the number of internal seals required by the connector. This reduces manufacturing costs and also facilitates repairing the connector by eliminating the time consuming process of replacing difficult to access internal seals.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows:

FIG. 3 shows an end view illustrating the split collet arrangement of the connector of FIGS. 1 and 2;

FIG. 4 shows an end view of an alternative cross member constructed in accordance with the principles of the present invention;

FIG. 5 shows a partial side view of the cross member of FIG. 4, the cross member is shown mounted on an expansion pin;

FIG. 6 shows an end view of another cross member constructed in accordance with the principles of the present invention;

DETAILED DESCRIPTION OF THE INVENTION

Reference will now be made in detail to exemplary embodiments of the present invention which are illustrated in the accompanying drawings. Wherever possible, the same reference numbers will be used throughout the drawings to refer to the same or like parts.

Figure 1:
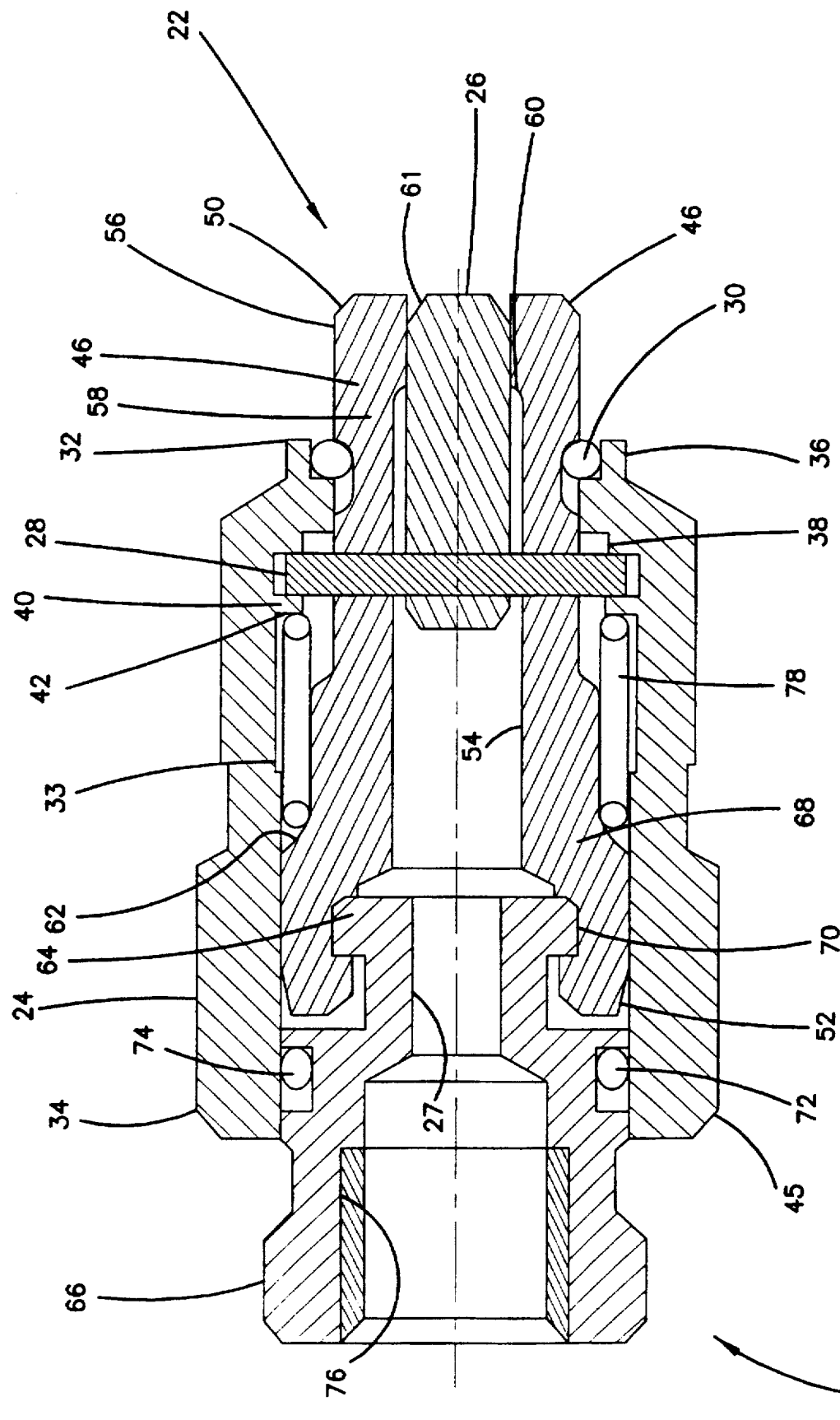
FIG. 1 shows a cross-sectional view of a connector constructed in accordance with the principles of the present invention, the connector is shown in a retracted position.
Figure 2:
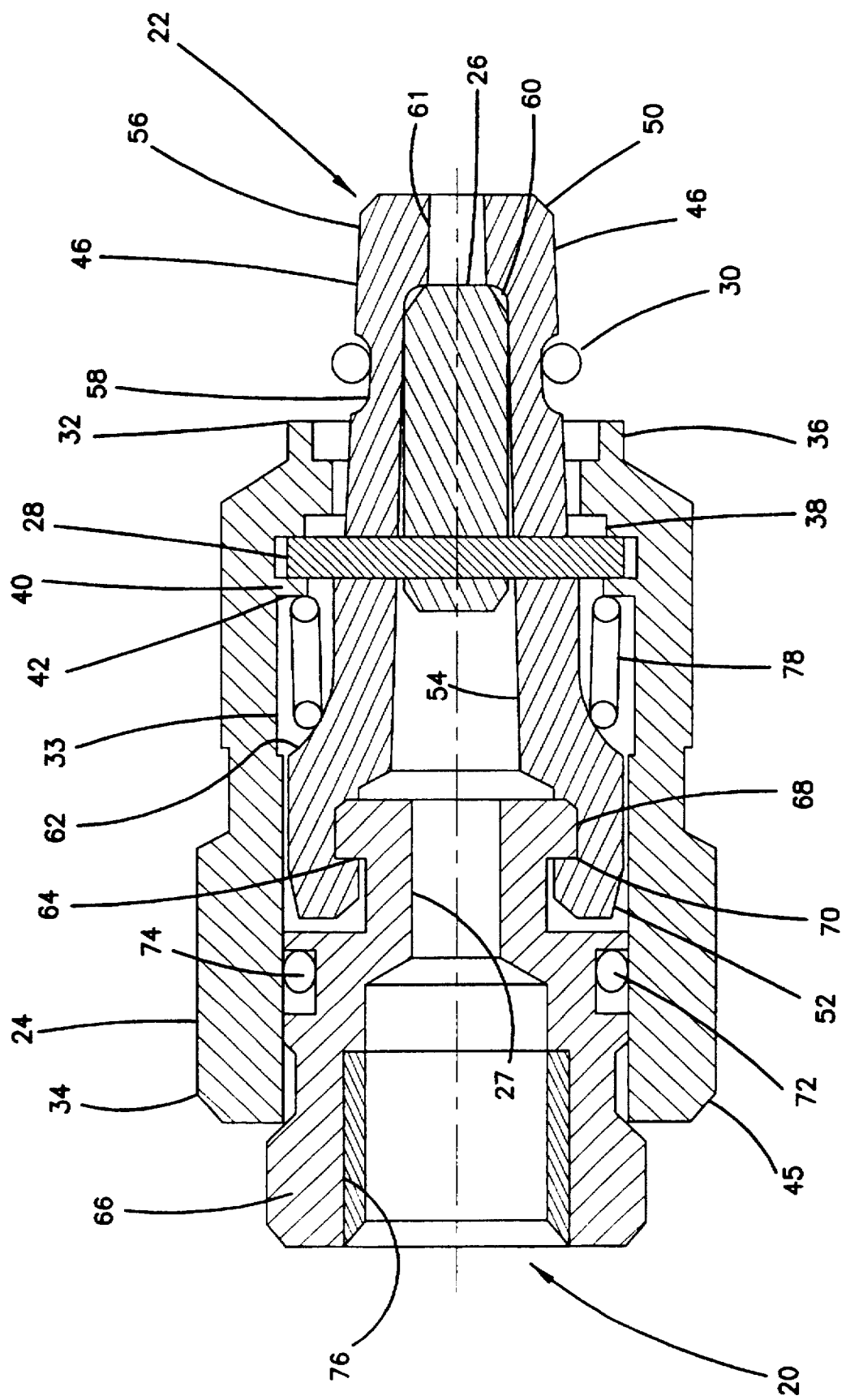
FIG. 2 shows a cross-sectional view of the connector of FIG. 1 in an extended position.

FIGS. 1–3 show a connector 20 constructed in accordance with the principles of the present invention. The connector 20 is typically used to provide a fast, leak free connection to a threaded fluid port for such purposes as pressure and vacuum leak testing, fluid filling and flushing.

The connector 20 preferably includes a threaded split collet 22 that is retractably mounted within an exterior sleeve 24. The connecter 20 also includes an expanding pin 26 that is preferably connected to the exterior sleeve 24 by a cross member 28. The expanding pin 26 cooperates with the split collet 22 to expand and contract the split collet 22. The expandability of the collet 22 allows the collet 22 to mate with a fluid port, such as a threaded fluid port of a test product designed to hold fluid or work under pressure or vacuum. A primary elastomeric seal 30 mounted on the split collet 22 functions to provide a leak free seal between the exterior sleeve 24 and the fluid port.

The exterior sleeve 24 is generally cylindrical and includes a first end 32 opposite a second end 34. The sleeve 24 defines a longitudinal channel 33 extending between the first and second ends 32 and 34. An exterior annular shoulder 36 is located at the first end 32 of the sleeve 24. The exterior shoulder 36 functions as a mechanical barrier for preventing the primary seal 30 from extruding.

The sleeve 24 also defines an interior annular shoulder 38 near the first end 32 for engaging the ends of the cross member 28. Adjacent the interior shoulder 38 the exterior sleeve 24 defines an interior annular groove 40 for receiving a retaining ring 42 that is preferably snapped within the groove 40. The cross member 28 is captured between the interior shoulder 38 and the retaining ring 42. In this manner, the cross member 28 extends generally transversely across the longitudinal channel 33 and is secured to the sleeve 24 through the cooperation of the interior shoulder 38 and the retaining ring 42.

The exterior diameter of the sleeve 24 is preferably larger adjacent to the second end 34 of the sleeve 24 so as to form an enlarged gripping portion 45. The enlarged gripping portion 45 is preferably knurled to facilitate gripping.

The diameter of the longitudinal channel 33 of the sleeve 24 is larger at the second end 34 than the first end 32. The difference in diameters causes unbalanced loading on the sleeve 24 when pressure is introduced through the sleeve 24. The unbalanced loading causes the sleeve 24 to move toward the primary seal 30 such that a pressure assisted seal is created by the mechanical barrier 36 of the sleeve 24. Further description of the pressure assisted seal or the mechanical barrier is included in U.S. Pat. No. 4,688,830 that is hereby incorporated by reference.

The split collet 22 of the connector 20 is slidingly mounted within the longitudinal channel 33 of the exterior sleeve 24. The split collet 22 is preferably constructed of a plurality of individual collet members 46. It is preferred for the collet 22 to include six collet members 46, however, this number can be varied. As shown in the end view of FIG. 3, the collet members 46 preferably have generally wedge shaped transverse cross sections and are arranged such that the split collet 22 is generally cylindrical.

The split collet 22 includes a distal end 50 opposite from a proximal end 52. An interior surface of the collet 22 defines an axial bore 54 extending between the ends 50 and 52. The distal end 50 of the collet 22 preferably extends beyond the first end 32 of the sleeve 24. Adjacent the distal end 50 of the collet 22, the exterior surface of the collet 22 preferably defines structure, such as a threaded portion 56, that is adapted to mate with a threaded fluid port. Proximal from the threaded portion 56, the exterior surface of the split collet 22 defines an annular exterior groove 58 configured for receiving the primary seal 30. The primary seal 30 preferably comprises a O-ring that is mounted within the groove 58 and is made of an elastomeric material such as Neoprene, Urethane, Buna-N, Fluorocarbon or EPR.

Adjacent to the distal end 50 of the collet 22, the interior surface of the collet 22 defines a first radial ramp 60. The first radial ramp 60 is annular and configured such that a reduced internal diameter portion 61 of the collet 22 is formed adjacent to the distal end 50 of the collet 22. The ramp 60 is inclined to facilitate movement of the expanding pin 26 into the reduced diameter portion 61 of the collet 22 such that the threaded portion 56 of the collet 22 expands radially outward. The expanding pin 26 is mounted within the axial bore 54 adjacent to the distal end 50 of the collet 22. The expanding pin 26 is preferably a machined piece having a cylindrical shape. It will be appreciated that in alternative embodiments of the present invention, the expanding pin 26 could be ramped rather than the collet 22.

The cross member 28 of the connector 20 preferably connects the expanding pin 26 to the sleeve 24 such that the sleeve 24 and the expanding pin 26 are prevented from moving axially with respect to each other. The expanding pin 26 can be connected to the cross member 28 in a variety of conventionally known manners. For example, the cross member 28 can be welded to the expanding pin 26 or press fit within a hole defined by the expanding pin 28. Additionally, the expanding pin 26 and the cross member 28 can be constructed as a unitary member.

The cross member 28 preferably comprises a pin, preferably extends transversely across the longitudinal channel 33 of the sleeve 24, and preferably extends between at least two of the individual collet members 46. For example, in the embodiment shown in FIGS. 1–3, the cross member 28 extends between the collet members 46 such that three collet members are located on one side of the cross member 28, and three collet members are located on the other side of the cross member 28. Because the cross member 28 is oriented between the collet members 46, the cross member 28 does not interfere with the sliding relationship between the collet 22 and the sleeve 24.

It will be appreciated that unlike prior art split collet connectors, the expanding pin 26 of the present invention does not extend longitudinally through substantially the entire length of the sleeve 24 and is not connected to a back portion of a connector. Instead, the cross member 28 allows the pin 26 to be connected to the sleeve 24 at a location adjacent to the first end 32 of the sleeve 24. Such a connection technique reduces the number of flow pathways within the connector 20 thereby reducing the number of seals required by the connector 20.

Also adjacent to the proximal end 52 of the collet 22, each of the collet members 46 define hook portions 64 for mounting the collet 22 on a mounting member 66. When the collet members 46 are assembled together, the hook portions 64 define an internal annular groove 68 configured to receive an annular end flange 70 of the mounting member 66. To mount the collet 22 on the mounting member 66, the hook portions 64 of the collet members 46 are individually inserted over the end flange 70 such that the end flange 70 is captured within the groove 68 defined by the collet members 46.

The mounting member 66 is generally cylindrical and is slidingly mounted within the longitudinal channel 33 of the exterior sleeve 24. The mounting member 66 defines an outer groove 72 for receiving an internal sealing member 74. The sealing member 74 is preferably an annular elastomeric seal that forms a slidable, fluid tight seal between the mounting member 66 and the interior surface of the exterior sleeve 24. The mounting member 66 includes connecting structure for connecting the connector 20 to an element such as a source of test fluid. As shown in FIGS. 1 and 2, the connecting structure includes an internally threaded port 76 that is coaxially aligned with the exterior sleeve 24. A central passage 127 provides fluid communication between threaded port 76 and the channel 33 of the sleeve 24. It will be appreciated that by plugging the threaded port 76, the connector 20 can be used as a quick connect plug.

The connector 20 also includes a spring structure such as a helical compression spring 78 that is mounted on the exterior of the split collet 22. The spring 78 is captured between the retaining ring 42 and a second annular ramp 62 extending radially outward from the collet 22.

The connector 20 is moveable between a retracted position (as shown in FIG. 1) and an extended position (as shown in FIG. 2). The spring 78 biases connector 20 toward the retracted position. When in the retracted position, the primary seal 30 is fit within the exterior shoulder 36 of the sleeve 24 and the expanding pin 26 engages the reduced internal diameter portion 61 of the collet such that the threaded portion 56 is expanded radially outward to an expanded orientation. While in the retracted position, it is preferred for the end of the expansion pin 26 to be flush with or slightly recessed from the distal end 50 of the collet 22. Such an orientation is preferred because it prevents the cross member 28 from being bent if the connector 20 is dropped.

When the split collet 22 is moved to the extended position, the seal 30 is offset from the first end 32 of the sleeve 24 and the spring 78 is compressed between the second ramp 62 of the collet 22 and the retaining ring 42. Also, the expansion pin 28 is disengaged from the reduced internal diameter portion 61 of the collet 22 and the spring 78 cooperates with the second ramp 62 of the collet 22 to compress the threaded portion 56 of the collet 22 radially inward to a contracted orientation.

The connector 20 is used to provide a quick connection to a threaded fluid port. In use, the exterior sleeve 24 is grasp and a force is applied to the mounting member 66 such that the collet 22 slides from the retracted position to the extended position. While in the extended position, the threaded portion 56 of the collet 22 is in the contracted orientation so as to have a reduced outer diameter. The reduced outer diameter allows the threaded portion 56 to be inserted in the fluid port without interference between the corresponding sets of threads.

Once the threaded portion 56 is within the fluid port, the force is removed from the mounting member 66 such that the spring 78 retracts the collet 22 from the extended position toward the retracted position. As the collet 22 retracts, the expansion pin 26 cooperates with the reduced diameter portion 61 of the collet 22 to expand the threaded portion 56 of the collet 22 such that the threaded portion 56 locks into the threads of the fluid port. The first ramp 60 facilitates the transition between the radially contracted and the radially expanded positions. The seal 30 is jointly biased against the fluid port by the spring 78 and the pressure assisted seal provided by the mechanical barrier of the sleeve 24. In this manner, the elastomeric seal 30 provides a fluid tight seal between the fluid port and the first end 32 of the sleeve 24.

It will be appreciated that the present invention includes a variety of different types of cross member configurations. For example, FIGS. 4 and 5 show a cross member 28' having a tripod structure. The cross member 28' includes a circular central member 80 defining a central opening 82 for receiving an expansion pin 26'. Three legs 84 or fins extend radially outward from the central member 80. When assembled in a connector such as connector 20, two collet members 46 fit between each of the legs 84 of the cross member 28'.

FIG. 5 shows one method for connecting the cross member 28' to the expansion pin 26'. The expansion pin 26' is inserted through the central opening 82. A shoulder 86 of the expansion pin 26' engages one end of the cross member 28'. A retaining ring 88 mounted in a groove 90 defined by the expansion pin 26' engages the other end of the cross member 28' such that the cross member 28' is retained on the expansion pin 26'. It will be appreciated that the expansion pin 26' could be press fit within the central opening 82 of the cross member 28' or the cross pin 28' and the expansion pin 26' could be unitarily constructed.

FIG. 6 shows a cross member 28" having six legs 92 or fins extending radially outward from a circular central member 94. The central member 94 preferably defines a central opening 96 for receiving an expansion pin. A circular ring member 98 that is coaxially aligned with the central member 94 connects the ends of the legs 92. When assembled in a connector such as connector 20, one collet member 46 fits between each of the legs 92 of the cross member 28" and the ring member 98 engages and is substantially flush with the interior annular shoulder 38 of the exterior sleeve 24.

It will be appreciated that cross members used in combination with the present invention could be constructed of by a variety of known manufacturing techniques such as extrusion, die casting, or electrical molding. Additionally, the cross members could be unitarily formed with the expansion pin or could be unitarily formed with the sleeve. Furthermore, although it is preferred, it is not required for the cross members to extend completely across the longitudinal channel 33 of the sleeve 24. Moreover, when it is described that cross members of the present invention extend generally transversely across a longitudinal bore of an exterior sleeve, it will be appreciated that such a description includes cross members that are slightly skewed with respect to a longitudinal axis of the exterior sleeve.

Figure 7:
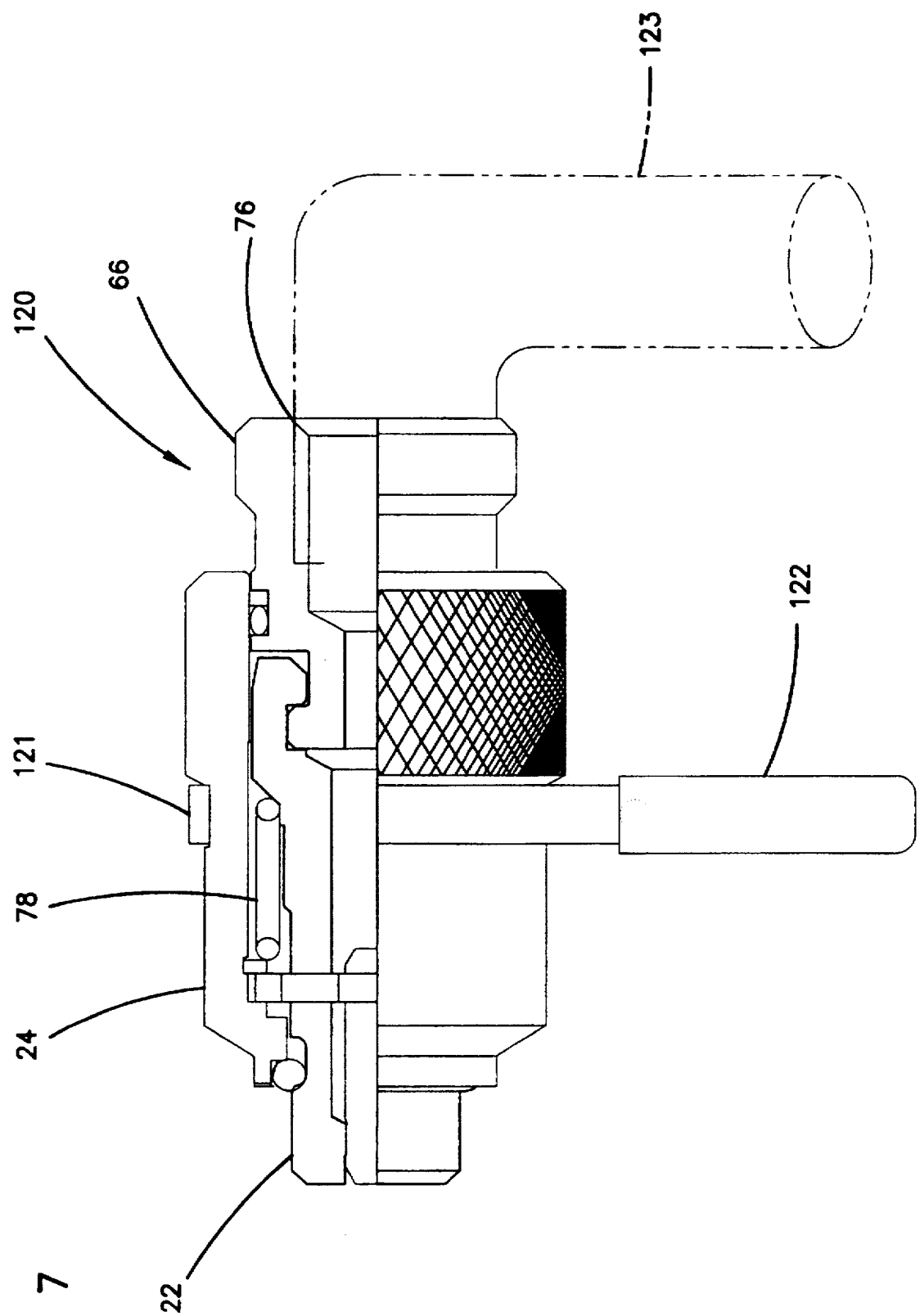
FIG. 7 shows an alternative connector that includes a pistol grip for facilitating actuating the connector.

FIG. 7 shows an alternative connector 120 constructed in accordance with the principles of the present invention. The connector 120 has the same construction as the connector 20 of FIGS. 1–3 except a gripping member 122 is connected to the exterior sleeve 24. The gripping member 122 preferably extends transversely outward from the external sleeve 24. The gripping member 122 preferably includes a looped portion 121 that extends around the perimeter of the exterior sleeve 24 to connect the gripping member 122 to the sleeve 24.

The gripping member 122 allows the connector 120 to be used with one hand. The gripping member 122 is grasped with the fingers of one hand while the thumb of the same hand is used to exert sufficient force on the mounting member 66 to push the split collet 22 to the extended position. If a L-shaped connector pipe 123 for providing test fluid is threaded into the port 76 of the mounting member 66, the connector can be actuated in a manner analogous to a pistol. The palm of a users hand is placed on the connector pipe 123 while the fingers of the same hand are placed on the gripping member 122. By pulling the fingers toward the palm the connector 120 is actuated in the same manner as pulling a trigger on a pistol.

Figure 8:
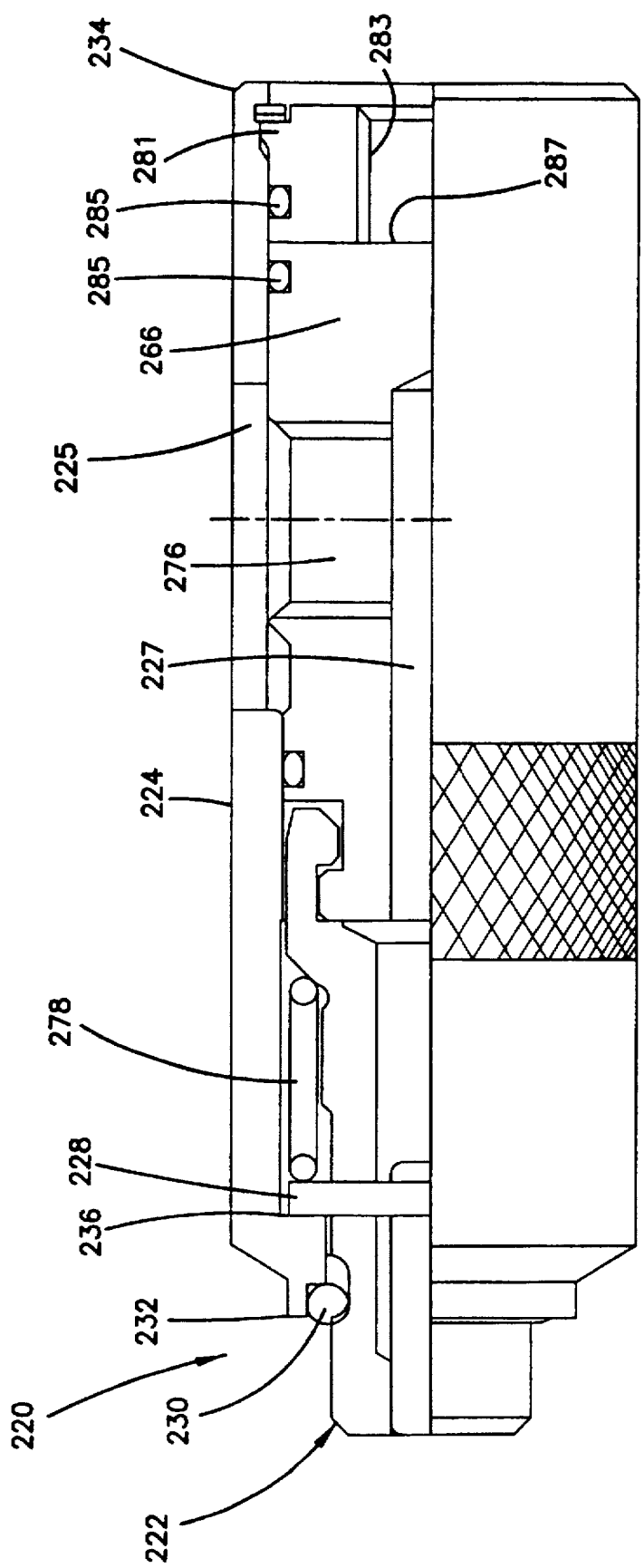
FIG. 8 shows an alternative connector constructed in accordance with the principles of the present invention, the connector is adapted to be hydraulically or pneumatically actuated.

FIG. 8 shows an alternative connector 220 constructed in accordance with the principles of the present invention. The connector 220 is constructed in the same manner as the connector 20, except that the connector 220 has been modified to include structure for allowing the connector to be hydraulically or pneumatically actuated. The connector 220 includes an extended exterior sleeve 224 defining a side opening 225 and having a first end 232 and a second end 234. A split collet 222 including a sealing member 230 is retractably mounted within the sleeve 224. The split collet 222 is expanded and contracted by an expansion pin 226 connected to the sleeve 224 by a cross member 228. The cross member 228 is captured between a shoulder 236 of the sleeve 224 and a compression spring 278. The split collet 222 is mounted on a mounting member 266 that defines an internally threaded port 276 typically used for providing a connection to a source of test fluid. The port 276 is transversely aligned with respect to the sleeve 224 and is aligned with the side opening 225 of the sleeve 224. The mounting member 266 defines a central passage 227 providing fluid communication between the port 276 and the interior of the sleeve 224.

The second end 234 of the sleeve 224 is enclosed by a fixture 281 defining a threaded port 283 for connecting a source of fluid pressure to the rear of the sleeve 224. Sealing members 285 provide fluid tight seals between the sleeve 224 and the fixture 281 and between the sleeve 224 and a rear portion of the mounting member 266. A transverse rear surface 287 of the mounting member 266 functions as a piston for driving the mounting member 266 and split collet 222 within the sleeve 224. When a source of compressed fluid is supplied to the rear surface 287 of the mounting member 266, the collet 224 is moved from a retracted position to an extended orientation. When the pressure is released, the compression spring 278 returns the collet 222 to the retracted position.

Figure 9:
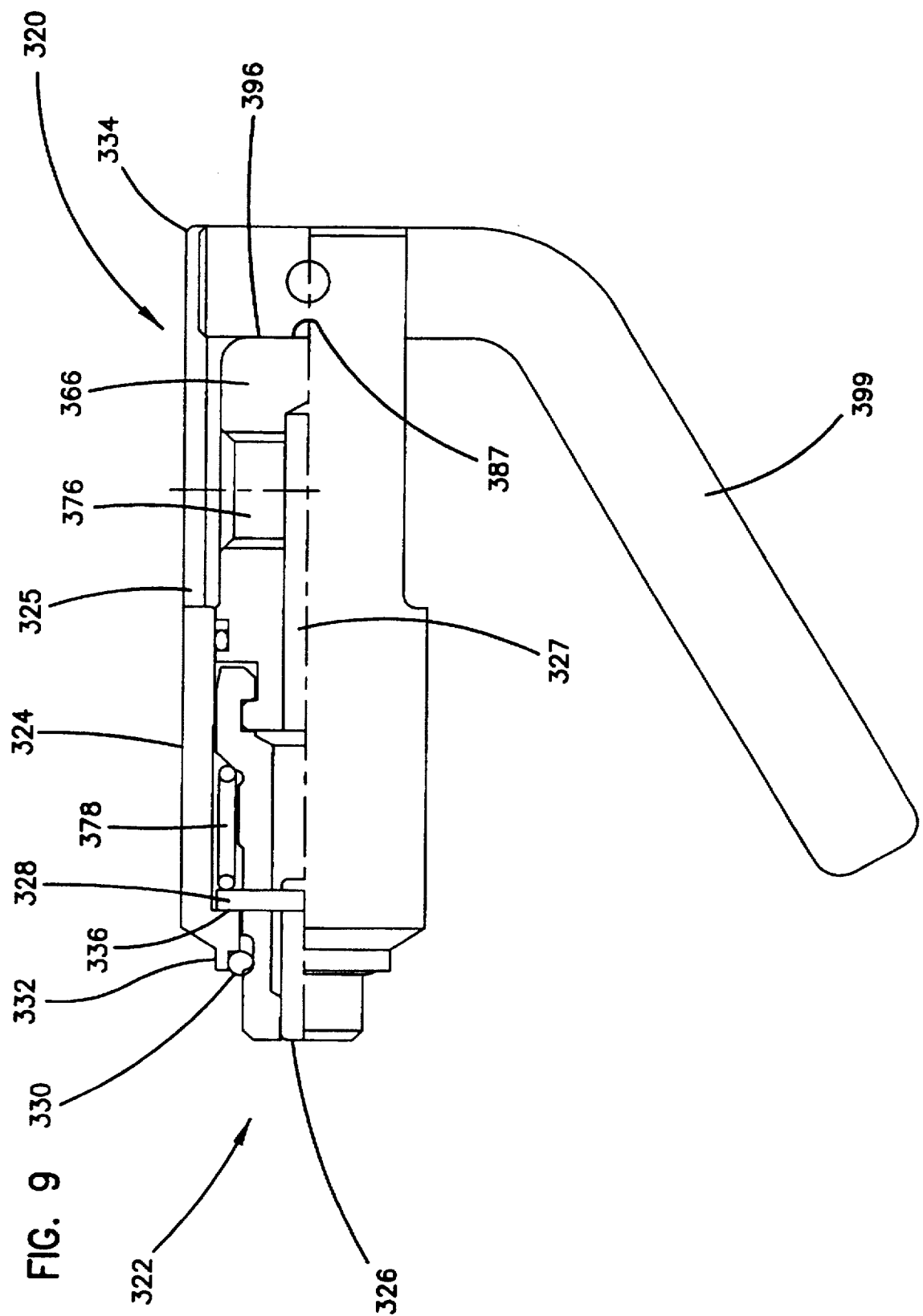
FIG. 9 shows another alternative connector constructed in accordance with the principles of the present invention, the connector is actuated by a pivotal handle connected to the rear of the connector.

FIG. 9 shows an alternative connector 320 constructed in accordance with the principles of the present invention. The connector 320 is constructed in the same manner as the connector 20, except that the connector 320 has been modified to include a pivoting handle 399 for actuating the connector 320. The connector 320 includes an extended exterior sleeve 324 defining a side opening 325 and having a first end 332 and a second end 334. A split collet 322 including a sealing member 330 is retractably mounted within the sleeve 324. The split collet 322 is expanded and contracted by an expansion pin 326 connected to the sleeve 324 by a cross member 328. The cross member 328 is captured between a shoulder 336 of the sleeve 324 and a compression spring 378. The split collet 322 is mounted on a mounting member 366 that defines an internally threaded port 376 typically used for providing a connection to a source of test fluid. The port 376 is transversely aligned with respect to the sleeve 324 and is aligned with the side opening 325 of the sleeve 324. The mounting member 366 defines a central passage 327 providing fluid communication between the port 376 and the interior of the sleeve 324.

The pivoting handle 399 is pivotally connected to the second end 334 of the exterior sleeve 324. The pivoting handle 399 is received within a transverse groove defined by the exterior sleeve 324 such that the handle 399 can pivot without interference from the sleeve 324. An interior surface 397 of the handle 399 engages a rear surface 387 of the mounting member 366. When the handle 399 is pivoted toward the sleeve 324, the interior surface 397 of the handle 399 exerts a force on the rear surface 387 of the mounting member 366 causing the collet 322 to move from a retracted position to an extended position. When the handle 399 is released, the compression spring 378 returns the collet 322 to the retracted position.

It will be appreciated that connectors constructed in accordance with the principles of the present invention can have a modular design such that a single connector can be adapted to use a variety of actuation structures. For example, depending upon the desired use, a single connector could be converted between a manual actuation structure, a pneumatic or hydraulic actuation structure, or a pivotal handle actuation structure.

Figure 10:
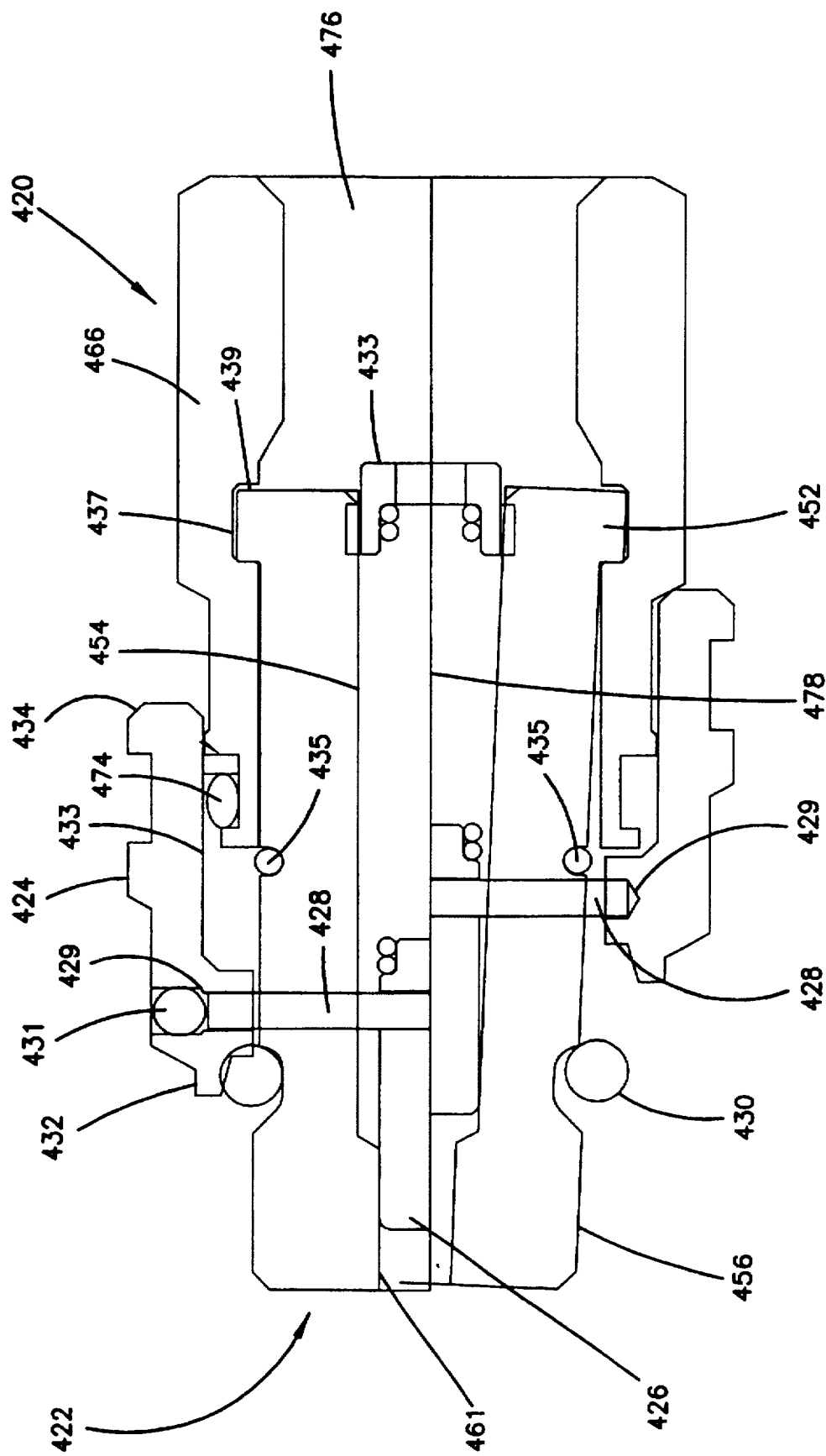
FIG. 10 shows another alternative connector constructed in accordance with the principles of the present invention.

FIG. 10 shows an alternative connector 420 constructed in accordance with the principles of the present invention. The connector 420 includes an exterior sleeve 424 having a first end 432 and a second end 434 and defining a longitudinal channel 433 extending thereinbetween. A split collet 422 having a threaded distal end portion 456 and a proximal end portion 452 is retractably mounted within channel 433 of the sleeve 424. A primary elastomeric seal 430 is mounted on the distal portion 456 of the collet 422. The split collet 422 is expanded radially outward and contracted radially inward by an expansion pin 426 that is mounted in an axial bore 454 defined by the split collet 422. The split collet 422 is expanded through interference between the expansion pin 426 and a reduced inner diameter portion 461 of the collet 422.

The expansion pin 426 is connected to the sleeve 424 by a cross member 428. The ends of the cross member 428 are fit within co-axial openings 429 defined by the sleeve 424. One of the openings 429 extends radially through the sleeve 424 to provide external access for inserting the cross member 428 into the openings 429. The external opening is sealed by a sealing and gripping plug 431 that may or may not be removable to allow for replacement of the cross member 428.

The connector 420 includes a compression spring 478 that is mounted in the axial bore 454 of the split collet 422. The spring 478 is captured between a rear end of the expansion pin 426 and a stop member 433 that is secured within the axial bore 454 adjacent to the proximal end portion 452 of the split collet 422. The spring 478 biases the collet 422 toward a retracted position. A resilient member such as an O-ring 435 is mounted on the exterior of the collet 422. The O-ring 435 exerts a uniform centripetal force on the collet 422 for contracting the collet 422 radially inward when the collet 422 is in an extended position.

The connector 420 also includes a mounting member 466 that is slidingly/telescopically mounted within the sleeve 424. An annular sealing member 474 is mounted on the mounting member 466 and forms a fluid tight between the mounting member 466 and the sleeve 424. The mounting member 466 defines an internal annular groove 437 for receiving an radially outwardly extending annular flange 439 defined formed by the proximal end portion 452 of the split collet 422. The mounting member 466 includes a threaded port 476 typically used for providing a connection to a source of test fluid. The port 476 is co-axially aligned with respect to the sleeve 424 to provide in-line flow through the connector 420. It will be appreciated that connector 420 provides a quick connection to a threaded port in fundamentally the same manner as the connector 20 of FIGS. 1-3.

Figure 11:
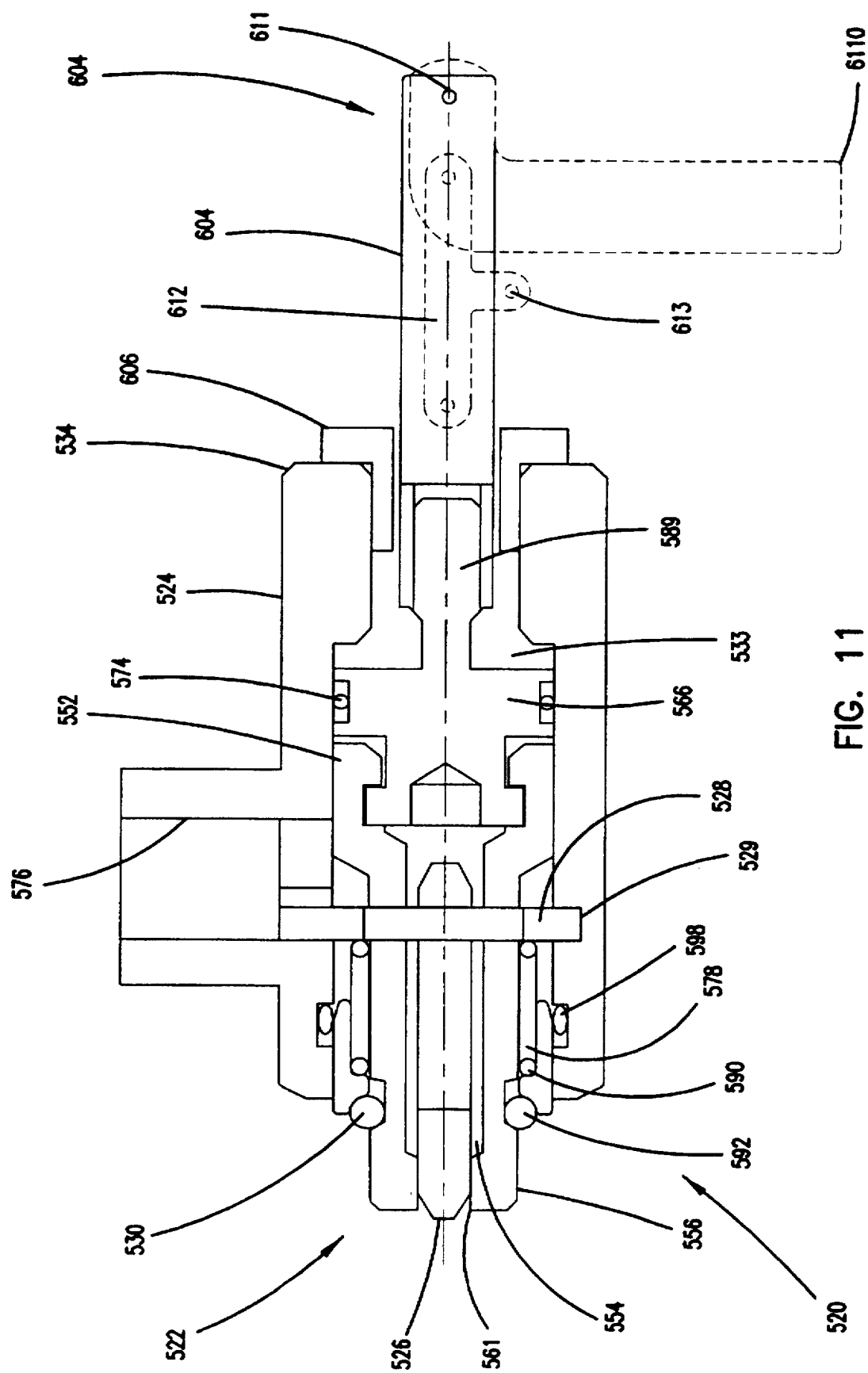
FIG. 11 shows an alternative connector constructed in accordance with the principles of the present invention, the connector includes a clamping mechanism and is shown in retracted position.
Figure 12:
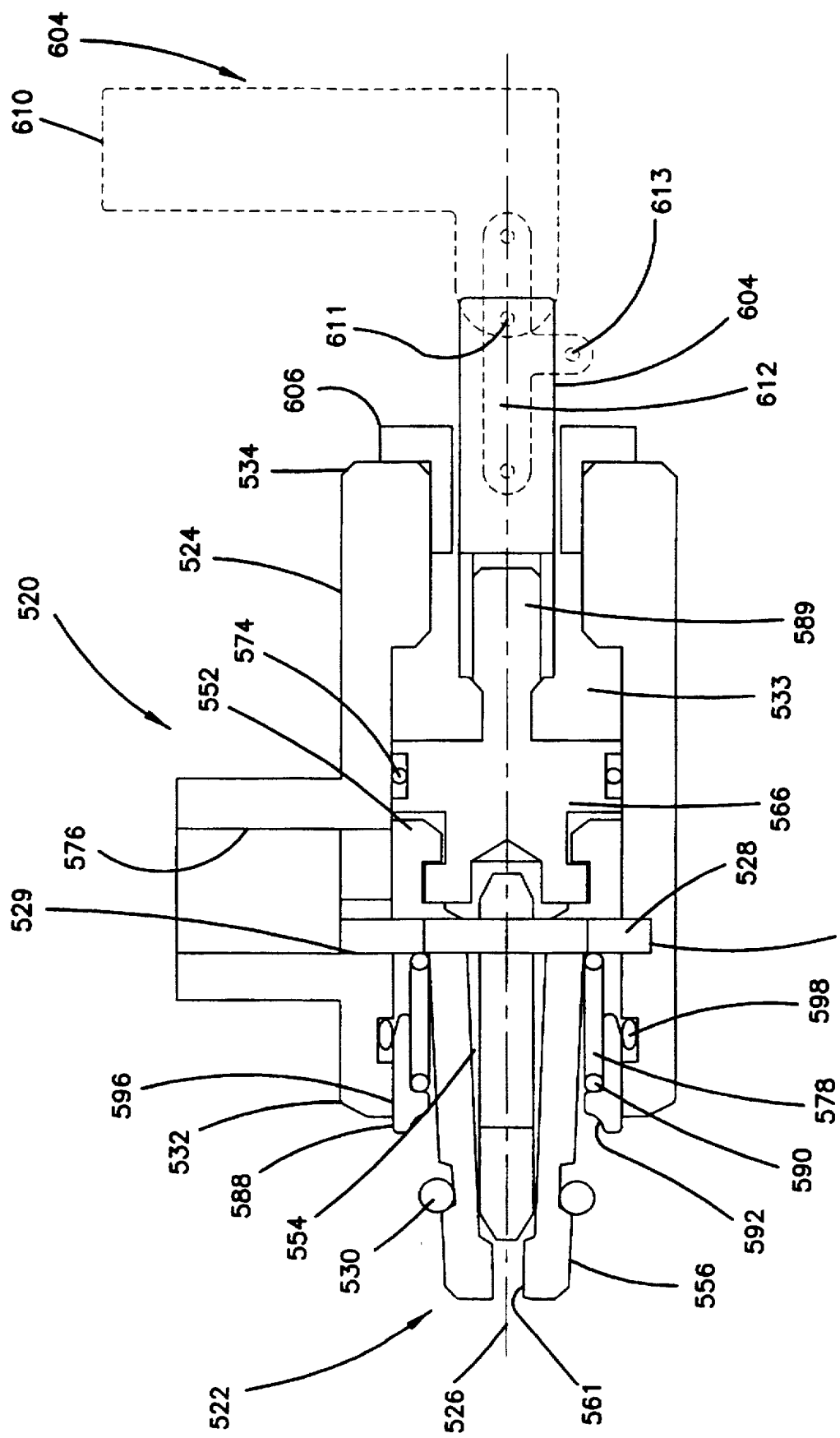
FIG. 12 shows the connector of FIG. 11 in an extended position.

FIGS. 11 and 12 show an alternative connector 520 constructed in accordance with the principles of the present invention. The connector 520 includes an exterior sleeve 524 having a first end 532 and a second end 534 and defining a longitudinal channel 433 extending thereinbetween. A split collet 522 having a threaded distal end portion 556 and a proximal end portion 552 is retractably mounted within channel 533 of the sleeve 524. A sealing member 530 is mounted on the distal portion 556 of the collet 522. The split collet 522 is expanded radially outward and contracted radially inward by an expansion pin 526 that is mounted in an axial bore 554 defined by the split collet 522. The split collet 522 is expanded through interference between the expansion pin 526 and a reduced inner diameter portion 561 of the collet 522. The expansion pin 526 is connected to the sleeve 524 by a cross member 528. The ends of the cross member 528 are fit within co-axial openings 529 defined by the sleeve 524.

The connector 520 includes a spring structure such as an elastomeric spring or a heavy helical compression spring 578 mounted on the split collet 522 within the sleeve 524. The heavy compression spring 578 is captured between the cross member 528 and an internal shoulder 590 formed by an end piece 588 of the connector 520. The end piece 588 comprises a generally cylindrical sleeve mounted within the longitudinal channel 533 adjacent to the first end 532 of the exterior sleeve 534. The end piece 588 fits over the spring 178 and includes an inclined annular outer shoulder 592 configured to engage the primary sealing member 530. The end piece 588 is secured within the exterior sleeve 524 by a retaining ring 596 that is captured between an annular radially inwardly extending shoulder defined exterior sleeve 524 and an annular radially outwardly extending shoulder defined by the end piece 588. An annular internal sealing member 598 forms a fluid tight seal between the end piece 588 and the exterior sleeve 524.

The exterior sleeve 524 includes a threaded port 576 typically used for providing a connection to a source of test fluid. The port 576 is transversely aligned with respect to the longitudinal axis of the sleeve 424 to provide side flow through the connector 420. The second end 534 of the sleeve 524 is enclosed by a mounting member 566 that is connected to the proximal end 552 of the split collet 522. An annular sealing member 574 provides a seal between the mounting member 566 and the exterior sleeve 524. A rear portion 589 of the mounting member 566 is adapted for connection to a clamping mechanism. A wide variety of lever actuated clamping mechanisms suitable for retracting and expanding the connector 520 are conventionally known in the art.

FIGS. 11 and 12 show the rear portion 589 of the mounting member 566 connected to a threaded body toggle clamp 604. The toggle clamp 604 provides a means for moving the mounting member 566 and the collet member 522 between a retracted position and an extended position. The toggle clamp 604 includes a piston 606 that threadingly engages the rear portion 589 of the mounting member 566. The piston 606 is slidingly mounted in a cylinder 608 that is threaded into the second end 534 of the exterior sleeve 524. The toggle clamp 604 is actuated by moving a handle 610 between first and second positions. A stop pin 613 prevents the handle 610 from pivoting past the first and second positions by contacting the piston 606.

The handle 610 of the toggle clamp 604 includes a transverse end portion 611 that is pivotally connected to the piston 606. A linkage 612 pivotally connects the handle 610 to the cylinder 608. One end of the linkage 612 is pivotally connected to the handle 610 while the other end of the linkage 612 is pivotally connected to the cylinder 608. The handle 610 is used to move the piston 606 axially within the cylinder 608. When the handle 610 is pivoted toward the first position, the transverse portion 611 of the handle 610 pulls the piston 606 axially outward from the cylinder 608. When in the first position, as shown in FIG. 11, the piston 606, the transverse portion 611 of the handle 610 and the linkage 612 are aligned along a single plane such that the piston 606 is locked in place. When the handle 610 is pivoted toward the second position, the transverse portion 611 of the handle 610 pushes the piston 606 axially into the cylinder 608. When in the second position, as shown in FIG. 12, handle 610 is pivoted 180 degrees from the first position and the piston 606, the transverse portion 611 of the handle 610 and the linkage 612 are aligned along a single plane such that the piston 606 is locked in place.

For use in combination with the connector 520, the toggle clamp 604 functions to actuate the connector 520 and to lock the connector in the retracted and extended positions. When the handle 610 of the toggle clamp 604 is moved to the first position, the collet 522 is moved to the extended position. In extended position, the distal portion 556 of the collet 522 is contracted radially inward to allow the distal portion 566 to fit within a threaded fluid port without interference. Once the distal portion 566 is inserted in the threaded fluid port, the handle 410 of the toggle clamp 604 is moved toward the second position causing the collet 522 to move toward the retracted position. As the collet 522 moves toward the retracted position, the distal portion 556 of the threads of the collet 522 engage the threads of the fluid port.

When the collet is almost completely retracted, the end piece 588 engages an end portion of the fluid port causing the end piece 588 to be displaced toward the heavy spring 578 such that the heavy spring 578 is compressed. The uniform force provided by the compressed heavy spring 578 provides a tight connection between the end piece 588 and the end portion of the fluid port. The spring 578 and the toggle clamp 604 cooperate in a manner analogous to a "vice grip" to provide a spring loaded connection between the end piece 588 and the fluid port. Such a tight connection allows the connector 520 to maintain a fluid tight seal in the presence of side loading.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning of the following claims.

What is claimed is as follows:

1. A connector for providing a fluid tight connection to a fluid port having internal threads, the connector comprising:
 an exterior sleeve including a first end opposite from a second end, the exterior sleeve including a longitudinal axis and defining a longitudinal channel forming a fluid flow path extending at least partially between the first and second ends;

a split collet mounted within the longitudinal channel of the exterior sleeve, the split collet defining an axial bore and including a distal end portion extending axially outward from the first end of the sleeve, the split collet and the external sleeve being telescopically slidable with respect to each other;

a sealing structure surrounding the distal end portion of the split collet, the sealing structure being adapted to provide a fluid tight seal with an end portion of the fluid port;

a solid expansion pin mounted within the axial bore of the split collet adjacent to the distal end portion of the split collet, the expansion pin being arranged and configured for radially contracting and radially expanding the distal end portion of the split collet, wherein when the split collet is contracted, the distal portion of the split collet is adapted to fit within the fluid port, and when the split collet is expanded, the distal end portion of the split collet is adapted to lockingly mate with the internal threads of the fluid port; and a cross member connecting the expansion pin to the exterior sleeve for fixing the expansion pin relative to the exterior sleeve, the cross member being located within the fluid flow path proximate the first end of the exterior sleeve and being aligned generally transversely with respect to the longitudinal axis of the exterior sleeve.

2. The connector of claim 1, wherein the cross member comprises a single cross pin extending across the longitudinal channel of the exterior sleeve.

3. The connector of claim 2, wherein the cross member is captured between an interior shoulder of the exterior sleeve and a retaining ring secured to the exterior sleeve.

4. The connector of claim 1, wherein the cross member includes opposing ends that are inserted with openings defined by the exterior sleeve.

5. The connector of claim 1, wherein the cross member includes a circular inner portion engaging the expansion pin, and a plurality of legs extending radially outward from the circular inner portion.

6. A connector for providing a fluid tight connection to a fluid port having internal threads, the connector comprising:

an exterior sleeve including a first end opposite from a second end, the exterior sleeve including a longitudinal axis and defining a longitudinal channel extending generally between the first and second ends;

a plurality of split collet members arranged to define a generally cylindrical split collet mounted within the longitudinal channel of the exterior sleeve, the split collet defining an axial bore and including a distal end portion extending axially outward from the first end of the sleeve, the split collet and the external sleeve being telescopically slidable with respect to each other;

a sealing structure surrounding the distal end portion of the split collet, the sealing structure being adapted to provide a fluid tight seal with an end portion of the fluid port;

an expansion pin mounted within the axial bore of the split collet adjacent to the distal end portion of the split collet, the expansion pin being arranged and configured for radially contracting and radially expanding the distal end portion of the split collet, wherein when the split collet is contracted, the distal portion of the split collet is adapted to fit within the fluid port, and when the split collet is expanded, the distal end portion of the split collet is adapted to lockingly mate with the internal threads of the fluid port; and a cross member connecting the expansion pin to the exterior sleeve for preventing relative axial movement between the expansion pin and the exterior sleeve, the cross member extending between the collet members.

7. The connector of claim 6, wherein the cross member comprises a single cross pin extending across the longitudinal channel of the exterior sleeve.

8. The connector of claim 7, wherein the cross member is captured between an interior shoulder of the exterior sleeve and a retaining ring secured to the exterior sleeve.

9. The connector of claim 6, wherein the cross member includes opposing ends that are inserted with openings defined by the exterior sleeve.

10. The connector of claim 6, wherein the cross member includes a circular inner portion engaging the expansion pin, and a plurality of legs extending radially outward from the circular inner portion.

11. The connector of claim 6, further comprising a lever pivotally connected to the exterior sleeve for moving the collet from the retracted position to the extended position.

12. The connector of claim 6, wherein the connector is adapted to be pneumatically activated.

13. The connector of claim 6, wherein the connector is adapted to be hydraulically activated.

14. The connector of claim 6, wherein the connector includes a gripping member extending generally transversely outward from the exterior sleeve.

15. The connector of claim 6, wherein the connector includes an end piece mounted within the first end of the exterior sleeve and adapted to engage the end portion of the fluid port; a spring structure constructed and arranged to be compressed by the end piece when the end piece is engaged by the end portion of the fluid port; and a clamping mechanism for moving the split collet between the extended and retracted positions, wherein when the split collet is moved to the retracted position, the clamping mechanism, the end piece and the spring structure cooperate to resist side loading of the connector.

16. A connector for providing a fluid tight connection to a fluid port having internal threads, the connector comprising:

an exterior sleeve including a first end opposite from a second end, the exterior sleeve including a longitudinal axis and defining a longitudinal channel extending generally between the first and second ends;

a split collet mounted within the longitudinal channel of the exterior sleeve, the split collet defining an axial bore and including a distal end portion extending axially outward from the first end of the sleeve, the split collet and the external sleeve being telescopically slidable with respect to each other;

a sealing structure surrounding the distal end portion of the split collet, the sealing structure being adapted to provide a fluid tight seal with an end portion of the fluid port;

an expansion pin mounted within the axial bore of the split collet adjacent to the distal end portion of the split collet, the expansion pin being arranged and configured for radially contracting and radially expanding the distal end portion of the split collet, wherein when the split collet is contracted, the distal portion of the split collet is adapted to fit within the fluid port, and when the split collet is expanded, the distal end portion of the split collet is adapted to lockingly mate with the internal threads of the fluid port; and a cross member connecting the expansion pin to the exterior sleeve for preventing relative axial movement between the exterior sleeve and the expansion pin, the cross member being located proximate the first end of the exterior sleeve and being aligned generally transversely with respect to the longitudinal axis of the exterior sleeve, wherein the cross member comprises a single cross pin extending across the longitudinal channel of the exterior sleeve and captured between an interior shoulder of the exterior sleeve and a retaining ring secured to the exterior sleeve.

17. A connector for providing a fluid tight connection to a fluid port having internal threads, the connector comprising:

an exterior sleeve including a first end opposite from a second end, the exterior sleeve including a longitudinal axis and defining a longitudinal channel extending generally between the first and second ends;

a split collet mounted within the longitudinal channel of the exterior sleeve, the split collet defining an axial bore and including a distal end portion extending axially outward from the first end of the sleeve, the split collet and the external sleeve being telescopically slidable with respect to each other;

a sealing structure surrounding the distal end portion of the split collet, the sealing structure being adapted to provide a fluid tight seal with an end portion of the fluid port;

an expansion pin mounted within the axial bore of the split collet adjacent to the distal end portion of the split collet, the expansion pin being arranged and configured for radially contracting and radially expanding the distal end portion of the split collet, wherein when the split collet is contracted, the distal portion of the split collet is adapted to fit within the fluid port, and when the split collet is expanded, the distal end portion of the split collet is adapted to lockingly mate with the internal threads of the fluid port; and a cross member connecting the expansion pin to the exterior sleeve for preventing relative axial movement between the exterior sleeve and the expansion pin, the cross member being located proximate the first end of the exterior sleeve and being aligned generally transversely with respect to the longitudinal axis of the exterior sleeve, and the cross member including opposing ends that are inserted with openings defined by the exterior sleeve.

* * * * *